(12) United States Patent
Mendez et al.

(10) Patent No.: US 11,531,175 B2
(45) Date of Patent: Dec. 20, 2022

(54) ABRASION PROTECTED DEEPWATER CABLE

(71) Applicant: SUBCOM, LLC, Eatontown, NJ (US)

(72) Inventors: Jeremiah A. Mendez, Bayville, NJ (US); Marsha Spalding, Eatontown, NJ (US); Ralph Rue, Eatontown, NJ (US); Geraldine Paraiso, Eatontown, NJ (US); Georg Heinrich Mohs, East Brunswick, NJ (US); Seymour Shapiro, Long Beach, NJ (US)

(73) Assignee: SUBCOM, LLC, Eatontown, NJ (US)

( * ) Notice: Subject to any disclaimer, the term of this patent is extended or adjusted under 35 U.S.C. 154(b) by 0 days.

(21) Appl. No.: 16/887,736

(22) Filed: May 29, 2020

(65) Prior Publication Data

US 2021/0373264 A1 Dec. 2, 2021

(51) Int. Cl.
*G02B 6/44* (2006.01)
*G02B 6/50* (2006.01)

(52) U.S. Cl.
CPC ......... *G02B 6/4402* (2013.01); *G02B 6/4486* (2013.01); *G02B 6/506* (2013.01)

(58) Field of Classification Search
CPC .............................. G02B 6/4413; G02B 6/4427
See application file for complete search history.

(56) References Cited

U.S. PATENT DOCUMENTS

| | | | | |
|---|---|---|---|---|
| 5,095,176 A * | 3/1992 | Harbrecht | ............ | G02B 6/4422 174/107 |
| 5,146,046 A * | 9/1992 | Arroyo | .................. | H01B 7/288 174/23 R |
| 5,230,033 A * | 7/1993 | Soodak | ................ | G02B 6/4402 174/108 |
| 5,408,562 A * | 4/1995 | Yoshizawa | ........... | G02B 6/4408 385/110 |
| 5,892,874 A * | 4/1999 | Houghton | .............. | G02B 6/506 385/113 |
| 10,388,430 B1 * | 8/2019 | Evans | .................... | H01B 9/003 |
| 2002/0136511 A1 * | 9/2002 | Cecchi | ................ | G02B 6/4427 385/109 |

(Continued)

FOREIGN PATENT DOCUMENTS

CN 206877719 U 1/2018
CN 111261330 A * 6/2020

(Continued)

OTHER PUBLICATIONS

European Search Report dated Apr. 8, 2022, for the Patent Application No. 21169469.0, filed on Apr. 20, 2021, 9 pages.

*Primary Examiner* — Eric Wong
(74) *Attorney, Agent, or Firm* — KDB Firm PLLC (57) ABSTRACT

An improved deepwater optical fiber cable with abrasion protection and techniques for manufacturing the same are provided. For example, the abrasion protected deepwater cable may be a modification or enhancement of an existing special application (SPA) optical fiber cable. One or more additional layers of metallic tape and jackets may be added to the outermost layer of the SPA cable. The tape and jacket layers may have different thicknesses and may be made from different materials to optimize protection against man-made objects or otherwise naturally occurring materials in deep water environments, such as fish aggregation devices (FADs).

19 Claims, 8 Drawing Sheets

(56) References Cited

U.S. PATENT DOCUMENTS

2011/0075979 A1    3/2011  Ma et al.
2018/0231729 A1*  8/2018  Baetz .................. G02B 6/4435
2020/0310059 A1*  10/2020  Sirin .................. G02B 6/4436

FOREIGN PATENT DOCUMENTS

CN      213183630 U  *  5/2021
GB        2247325 A     2/1992

* cited by examiner

ABRASION PROTECTED DEEPWATER CABLE

BACKGROUND OF THE INVENTION

Field of the Invention

Embodiments of the present disclosure relate to the field of optical communication systems. More particularly, the present disclosure relates to an improved deepwater optical fiber cable configured to protect against or withstand external aggression from objects present in deepwater environments, such as abrasion damage caused by fish aggregation devices (FADs).

Discussion of Related Art

For portions of a submarine optical communication system, unarmored optical fiber cables may be deployed to deep ocean depths (e.g., 2,000 to 8,000 meters) in traditional applications. Typically, these cables are suitable for deepwater deployment because there is little to no risk of external aggression or abrasion on the cables at such depths. Recently, however, numerous fish aggregation (or aggregating) devices (FADs) are being used or employed along planned submarine cable routes in deep waters, which threatens not only the functionality of deepwater cables but also the long-term viability of the submarine optical communication system.

Figure 8:
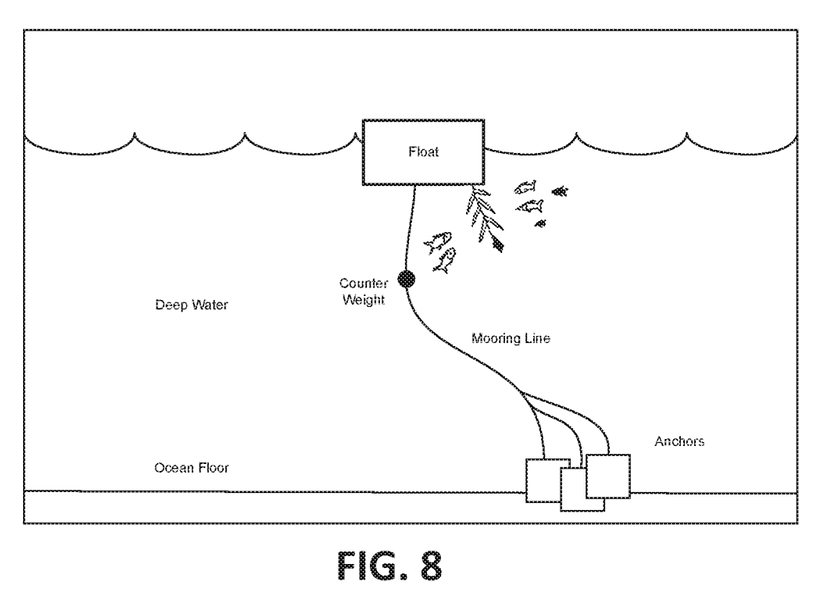
FIG. 8 illustrates an example fish aggregation device (FAD).

FADs may be objects used by both commercial and recreational fisheries to attract various types of pelagic fish, such as marline, tuna, and mahi-mahi. Anchored FADs are generally man-made and usually consist of buoys or floats that are tethered to anchors (e.g., concrete blocks, large drums filled with concrete) on the ocean floor using mooring lines (e.g., rope, floating synthetics). FIG. 8 illustrates an example of a man-made anchored FAD. Drifting FADs are not tethered to the bottom and can be either man-made or made from natural objects, such as logs or driftwood. Today, there are numerous FADs in use worldwide for industrial handline, purse seine, and pole and line fisheries.

FADs may cause at least two different types of damage to unarmored deepwater cables. For example, when a cable is overlaid on or tangles with a mooring line of an anchored FAD, abrasion damage can occur at a "clashing point" from at least the weight force of the cable on the mooring line and the constant rubbing therebetween. In other cases, abrasion or other types of damage may occur when the unarmored cable is inadvertently laid across or over a FAD floating component, such as a buoy, float, etc. And in some instances, FAD anchors (e.g., concrete blocks, drums filled with concrete) may crush or otherwise cause physical impact on the unarmored deepwater cables.

One possible solution for mitigating or preventing FAD-related damage may be to deploy traditional armored optical fiber cables typically used in more shallow water at deep ocean depths. Typically, armored cables are designed to be deployed in areas of rugged or aggressive sea bottom terrain (not at deep ocean depths), where the outer or outermost layers of the armored cables are protected with helically wound high-strength metal wires.

The deployment of armored cables at such deep depths, however, involves at least two inherent problems that could render this solution inadequate. One problem is not being able to maintain bottom tension of the armored cables during installation due to the deep ocean depths. Without adequate maintenance of bottom tension, torque generation inherent in the helically wound metal wires arranged at the outer or outermost layers of the armored cables may cause cable looping or kinking, which could result in shunt faults or other types of damage to the cables. Another problem occurs when the armored cables are overlaid on or tangles with a FAD mooring line, which may result in the loss of bottom tension and slack accumulation and thereby causing loop formations and potential kinking of the cables.

SUMMARY OF THE INVENTION

An improved deepwater optical fiber cable with abrasion protection and techniques for manufacturing the same are provided. For example, the abrasion protected deepwater cable may be a modification or enhancement of an existing special application (SPA) optical fiber cable. One or more additional layers of metallic tape and jackets may be added to the outermost layer of the SPA cable. The tape and jacket layers may have different thicknesses and may be made from different materials to optimize protection against man-made objects or otherwise naturally occurring materials in deep water environments, such FADs.

In one embodiment, an optical fiber cable may include a cable core, a first tape-jacket layer wrapped around the cable core, a second tape-jacket layer wrapped around the first tape-jacket layer, and a third tape-jacket layer wrapped around the second tape-jacket layer. In examples, the third tape-jacket layer may be thicker than the second-tape jacket layer.

In another embodiment, an optical fiber cable may include a cable core, a first metallic tape wrapped around an outermost layer of cable core, a first jacket wrapped around the first metallic tape, a second metallic tape wrapped around the first jacket, and a second jacket wrapped around the second metallic tape. In examples, an outer diameter of the second metallic tape may be greater than an outer diameter of the first metallic tape, an outer diameter of the second jacket may be greater than an outer diameter of the second metallic tape.

In yet another embodiment, a method for manufacturing an optical fiber cable may include passing an SPA optical fiber cable through machinery and wrapping a first metallic tape around an outermost layer of the SPA cable to form a first layered cable and passing the first layered cable through the machinery and wrapping a first cable jacket around or extruding first jacket material onto the first metallic tape to form a second layered cable. The method may further include passing the second layered cable through the machinery and wrapping a second metallic tape around the first cable jacket or first jacket material to form a third layered cable and passing the third layered cable through the machinery and wrapping a second cable jacket around or extruding second jacket material onto the second metallic tape.

DESCRIPTION OF EMBODIMENTS

The present invention is generally directed to an improved deepwater optical fiber cable configured and designed to protect against or withstand external aggression from objects that may be present in deep water environments, such as abrasion damage or other types of damage caused by fish aggregation devices (FADs), as described above. While FADs are used and discussed herein as primary examples of such deepwater objects, it may be understood that other types of man-made or naturally occurring objects may exist in deep water environments that can potentially damage deepwater cables with similar effect.

According to embodiments, modifications or enhancements may be made to a special application (SPA) optical cable (e.g., typically already used in deepwater applications) to provide improved abrasion protection instead of deploying armored cables in deep waters. As will be further described in detail below, additional layers of metallic or conductive tape and cable jackets may be added to the existing SPA cable to provide multiple layers of protection. In one example, two additional layers of tape and jackets may be added and layered such that the SPA cable has a total of three tape-jacket layers. In a further example, one additional layer of tape and jacket may be added such that the SPA cable has a total of two tape-jacket layers. Moreover, adjusting the thickness and/or the material of the one or more tape-jacket layers of the SPA cable may increase wear resistance and added protection from external aggression in deep water environments.

The embodiments and examples described herein are advantageous in that the use and implementation of a modified SPA deepwater cable design (and not armored cables) almost entirely or entirely eliminates any risk or problem associated with the torque-induced looping or kinking of armored cables. Moreover, using additional layers of tape and jacket material found in SPA cables takes advantage of existing qualified materials and cable manufacturing processes, which enables streamlined and cost-effective manufacturing.

The present invention will now be described more fully hereinafter with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

Figure 1:
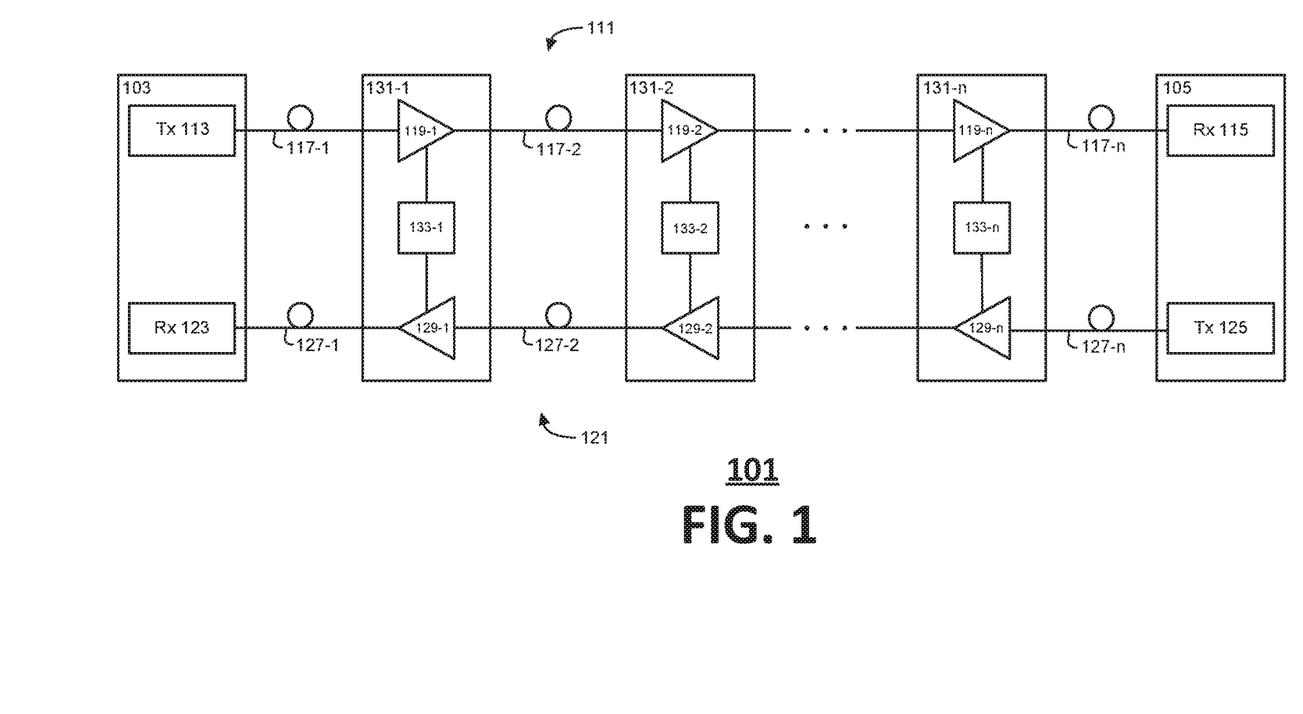
FIG. 1 illustrates an example optical communication system.

Referring to the drawings, FIG. 1 illustrates an example of a bi-directional optical communication system 101. The bi-directional optical communication system 101 may use high-bandwidth fiber optics to transmit vast amounts of data over long distances. Bi-directional data transmission may be implemented by constructing pairs of optical fiber paths within an optical trunk cable and transmitting one or more channels, e.g., wavelength division multiplexed channels, per fiber pair. It may be understood that the optical fiber paths may be included in different types of cables in accordance with the cable-route environments. For instance, optical fiber paths in at least a first portion (e.g., portion traversing deep waters) of the communication system 101 may be included in an SPA optical cable. In another instance, optical fiber paths in at least a second portion (e.g., portion traversing rugged or aggressive sea bottom terrain near shore) of the communication system 101 may be included in armored cable.

As shown, the optical communication system 101 may include terminals 103 and 105 connected by two unidirectional optical paths 111, 121, which together form a bi-directional optical path. Optical path 111 may transmit information in one direction (e.g., to the right) from a transmitter 113 at terminal 103 to a receiver 115 at terminal 305. Optical path 121 may transmit information in the other direction (e.g., to the left) from a transmitter 125 at terminal 105 to a receiver 123 at terminal 103. With respect to terminal 103, the optical path 111 is an outbound path and the optical path 121 is an inbound path. The optical path 111 may include optical fibers 117-1 to 117-$n$ and optical amplifiers 119-1 to 119-$n$, and the optical path 121 may include optical fibers 127-1 to 127-$n$ and optical amplifiers 129-1 to 129-$n$. The one or more of the optical amplifiers 119-1 to 119-$n$ and 129-1 to 129-$n$ may be Erbium Doped Fiber Amplifiers (EDFAs), or other rare earth doped fiber amplifiers, Raman amplifiers, or semiconductor optical amplifiers (SOAs). It may be understood that, in some examples, transmitter 113 and receiver 123 may be housed together as a transponder at terminal 103, and similarly, transmitter 115 and receiver 125 may also be housed together as a transponder at terminal 105. The terminals 103 and 105 may also include power feed equipment used to supply power to the communication system as well as line monitoring equipment used to monitor the condition of the system and components therein.

The optical path pair (e.g., optical paths 111, 121) may be configured as a set of amplifier pairs 119-1 to 119-$n$ and 129-1 to 129-$n$ within repeaters 131-1 to 131-$n$ connected by pairs of optical fibers 117-1 to 117-$n$ and 127-1 to 127-$n$, which may be included in an optical fiber cable together with fibers supporting additional path pairs. Each repeater 131 may include a pair of amplifiers 119, 129 for each path pair and may include additional amplifiers for additional path pairs. A coupling path 133-1 to 133-$n$ may be coupled between optical paths 111, 121, for example, in one or more of the repeaters 131-1 to 131-$n$. It may be understood that the term "couple" or "coupled," as used herein, broadly refers to any connection, connecting, coupling, link, or linking, either a direct or indirect o connection and does not necessarily imply that the coupled components or elements are directly connected to each other.

Although an exemplary embodiment of the optical communication system 101 is shown and described, variations of the optical communication system 101 are within the scope of the present disclosure. The optical communication system 101 may include, for example, more optical path pairs and more or fewer repeaters as well as additional branch cables connected to the trunk cable. Alternatively, the optical communication system 101 may not include any optical amplifiers or may include, instead of optical amplifiers, optical pump power sources suitable for implementing optical gain by Raman amplification within optical fibers connecting repeaters.

Moreover, it may be understood that the transmitters, receivers, transponders (containing the transmitters and receivers), or any other suitable device for transmitting and receiving data, may include at least one memory and one or more processors (e.g., CPU, ASIC, FGPA, any conventional processor, etc.) to execute instructions stored in memory.

Figure 2:
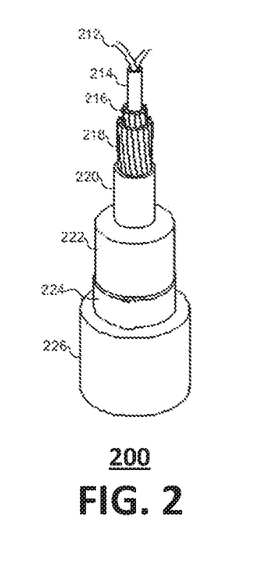
FIG. 2 illustrates an example special application (SPA) cable.

FIG. 2 illustrates an example of a special application (SPA) optical cable 200 according to embodiments. As described above, traditionally, the SPA cable 200 may be deployed for deepwater applications at ocean depths of approximately 2,000 to 8,000 meters. As shown, the SPA cable 200 may be a single tape-jacket layer protected optical cable and include optical fibers 212 surrounded by a tube 214. The fibers 212 and tube 214 may be reinforced by one or more layers of strength members 216, 218 (e.g., wire layers).

The optical fibers 212 may be or include any type of optical fiber capable of carrying optical signals and providing suitable dispersion characteristics. Further, the tube 214 may be made of a polymer such as polycarbonate or polyamide, or may be made of a metal such as stainless steel, copper, aluminum, etc. Moreover, the tube 214 may also include a gel, such as a thixotropic, water-blocking gel, which can surround the optical fibers 212. The strength members 216, 218 may include first and second layers of high-strength steel wires with water-blocking material in the interstices between the wires. In some examples, a plurality of wires of the strength members 216 may circumferentially alternate with a plurality of wires of the strength members 218 where the diameter of the wires of the strength members 216, 218 may vary in size.

As further shown, the SPA cable 200 may include a conductor 220, which is covered by an insulating sheath 222. The conductor 220 may be made of a conductive material, such as copper, and in some examples, may serve as both an electrical conductor within the cable 200 and a hermetic barrier. The insulating sheath 222 may be a polymer sheath designed to encapsulate and insulate at least the conductor 220. Thus, the optical fibers 212, tube 214, strength members 216, 218, conductor 220, and insulating sheath 222 may collectively form what may be referred to herein as the "cable core" of the SPA optical cable 200.

Also illustrated in FIG. 2 is the cable core further being reinforced with a longitudinally wrapped adhesive-coated metallic tape 224 and a jacket 226, such as a sheath or any suitable cable enclosure for covering the underneath cable layer. In examples, the metallic tape may be made of steel and may have an outer diameter (OD) of 13.9 millimeters (mm). In further examples, the jacket 226 may be made of a high-density polyethene (HDPE) and may have an outer diameter of 17 mm. In at least that regard, the metallic tape 224 (e.g., steel tape) and the jacket 226 (e.g., HDPE natural jacket) forms what may be referred to herein as a "tape-jacket layer" or "tape-jacket pair." Thus, it may be understood that the existing SPA optical cable 200 has a single tape-jacket layer. Although the SPA cable 200 is illustrated as a single tape-jacket layer protected optical cable, it may be understood that multiple tape-jacket optical cables with more than two tape-jacket layers or sheaths may also be used.

Figure 3:
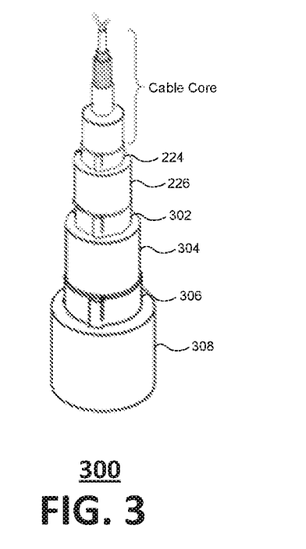
FIG. 3 illustrates a first example modification of the SPA cable.

FIG. 3 illustrates an example modification 300 of an SPA optical cable according to embodiments. For ease of explanation, the modification 300 will be described in relation or with respect to SPA cable 200. Thus, FIG. 3 shows the above-described cable core, the metallic tape 224, and jacket 226 that form or make up the SPA cable 200.

In embodiments, modification 300 of SPA 200 includes two additional, separate tape-jacket layers with differing thicknesses (e.g., increasing from the inner to outer layers) such that the modified or enhanced SPA optical cable has a total of three tape-jacket layers. As illustrated, an adhesive-coated metallic tape 302 (e.g., steel tape) may be wrapped longitudinally around jacket 226. For example, the metallic tape 302 may have an outer diameter of 17.6 mm. Moreover, a jacket 304 may be wrapped longitudinally around the adhesive-coated metallic tape 302. The jacket 304 may be made of HDPE (e.g., HDPE natural jacket) and has an outer diameter of 21 mm. In combination, the metallic tape 302 and the jacket 304 forms the first of the two additional tape-jacket layers described above.

As further shown, an adhesive-coated metallic tape 306 may also be wrapped longitudinally around jacket 304. The metallic tape 306 may be steel tape and may have an outer diameter of 21.5 mm. Further, a jacket 308 may be wrapped around the metallic tape 306 and may be made of HDPE (e.g., HDPE black jacket) similar to jacket 304. Tape 306 and jacket 308 forms the second of the two additional tape-jacket layers.

In one example, the outer diameter of jacket 308, which is the outermost jacket in the modification 300, may be 31.8 mm (or approximately 1.25 inches). In another example, the outer diameter of jacket 308 may be 38.1 mm (or 1.5 inches). Advantageously, the size variability or size changeability of the jacket diameter may provide increased design flexibility of the modified SPA. For instance, increasing the outer diameter of jacket 308 (e.g., 38.1 mm compared to 31.8 mm) provides additional abrasion protection on the cable by increasing wear resistance. Differently, decreasing the outer diameter (e.g., 31.8 compared to 38.1 mm) results in the use of less jacket material, which advantageously decreases the overall weight and material volume of the cable. It may be understood that, in addition to the diameter of the outermost jacket, the diameters of other components of modification 300 (e.g., tape 224, jacket 226, tape 302, jacket 304, tape 306) may also be adjusted or optimized.

Moreover, different types of material for the jacketing may be considered for improved abrasion protection. While the above-described jackets in modification 300 are made of HDPE, other suitable materials, such as nylons (e.g., Nylon 66, filled nylons) and thermoplastic urethane, may be used. Additional jacket materials that are extrudable may also be considered, for example, materials that are compatible on existing extrusion equipment. Similarly, it may be understood that the above-described metallic tapes may be made from any suitable metal that provides added protection. Accordingly, the various materials and the different combinations thereof will advantageously allow the optimization of layer thicknesses for abrasion resistance, weight, and/or deployment considerations.

Figure 4:
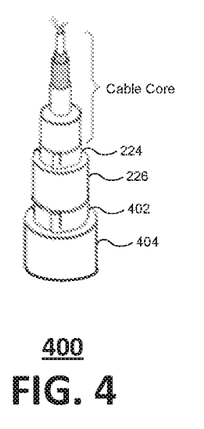
FIG. 4 illustrates a second example modification of the SPA cable.

FIG. 4 illustrates an example modification 400 of SPA cable according to embodiments. Again, for ease of explanation, modification 400 will be described in relation or with respect to SPA cable 200, where the above-described cable core, the metallic tape 224, and jacket 226 form or make up SPA cable 200. Modification 400 of SPA cable 200 includes only one additional tape-jacket layer such that the modified or enhanced SPA optical cable has a total of two tape-jacket layers. In that regard, modification 400 is identical to modification 300 up to jacket 304.

As shown, an adhesive-coated metallic tape 402, such as steel tape, may be wrapped longitudinally around jacket 226 and may have an outer diameter of 17.6 mm. Further, a jacket 404 may be wrapped longitudinally around the tape 402, where the jacket 304 may be made of HDPE (e.g., HDPE natural jacket) having an outer diameter of 21 mm. Thus, the tape 402 and jacket 404 forms the additional tape-jacket layer.

Similar to modification 300, the outer diameter of jacket 404 may be changed and optimized. In an alternative example, the diameter of the outermost jacket may be 31.8 mm. In another alternative example, the diameter may be 38.1 mm. Diameters of the other cable components, e.g., tape 402, jacket 226, tape 224, may also be varied and optimized. Further, the jackets 226, 404 may be made from other material other than HDPE, such as nylons and thermoplastic urethane, as described above.

Because modification 400 of SPA cable 200 has one less tape-jacket layer than modification 300, at least an advantage of modification 400 is that it may have a smaller cable thickness profile. While modification 300 provides more abrasion protection by way of the second additional tape-jacket layer, the smaller overall cable thickness associated with modification 400 may result in less overall cable weight and reduced manufacturing implications. As will be further described in detail below, cables having less weight may cause less abrasion force on the cables when overlaid on or tangled with, for example, a FAD mooring line.

With respect to the dimensional measurements described above related to FIGS. 2 to 4, it may be understood that the indicated values are not limiting in any manner and may be either an exact dimensional measurement or an approximate measurement. Furthermore, while FIG. 3 illustrates a modification or enhancement to SPA cable 200 that includes two additional tape-jacket layers, it may be understood that more than two additional tape-jacket layers may be added for even more abrasion protection.

Figure 5:
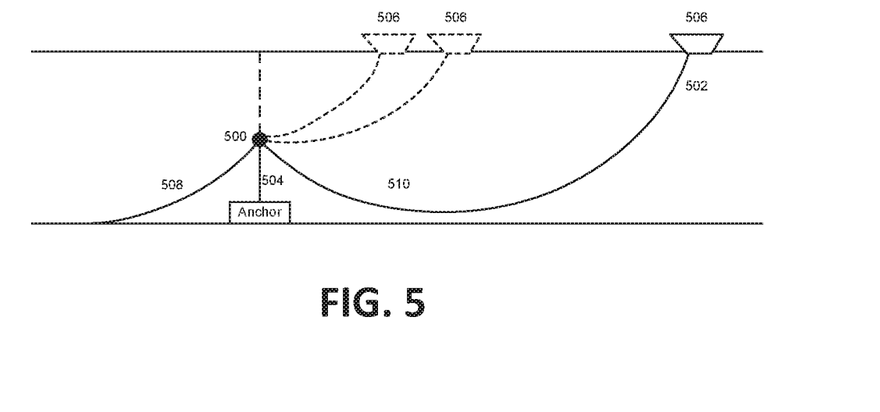
FIG. 5 illustrates an example clashing point.

FIG. 5 illustrates an example clashing point 500 between a deepwater optical fiber cable 502 and a FAD mooring line 504 according to embodiments. The deepwater cable 502 may be an SPA cable (e.g., SPA cable 200 of FIG. 2) or may be a modified SPA cable (e.g., modification 300, modification 400). A cable ship 506 may lay the deepwater cable 502 over (or the cable 502 may tangle with) the FAD mooring line 504 placed along a cable laying route of the ship 506. When this occurs, a clashing point 500 may form based on the interaction between the cable 502 and the mooring line 504. As illustrated, this interaction suspends the deepwater cable 502 and divides the suspended cable into two parts: a catenary 508 formed on the left-side of the clashing point 500 and a catenary 510 formed on the right-side of the clashing point 500.

As the cable ship 506 moves further along its cable route, the U-shape of the catenary 510 gets larger and more pronounced. Consequently, the normal force on the cable 502 at clashing point 500 along with the rubbing or chafing of the cable against the mooring line, abrasion damage may occur on the cable 502. This normal force may at least be dependent on the weight of the cable 502, e.g., greater cable weight produces greater normal force (e.g., thus greater wear force) at the clashing point 500.

To protect against the external aggression on the cable at clashing point 500, an improved abrasion protected deepwater cable, such as modification 300 to SPA cable 200 and modification 400 to SPA cable 200 described above, can be deployed over traditional deepwater cables as well as armored cables. At least both modifications 300, 400 and variations thereof may provide significant protection against abrasion in different ways.

For instance, despite the modified SPA cable associated with modification 300 weighing more than the modified SPA cable associated with modification 400 (and thus potentially causing greater wear force at a clashing point), the extra tape-jacket layer may provide the requisite protection against the greater wear force. And despite the modified SPA cable of modification 400 having one tape-jacket layer less than modification 300, modification 400 allows the deepwater cable to weigh less, which produces less normal force (and thus less wear force) at the clashing point 500. Accordingly, the thickness(es) and material(s) of the layers (individual or tape-jacket) of the improved abrasion protected deepwater cable may be optimally adjusted and matched for improved abrasion resistance, weight, and/or deployment considerations.

It may be understood that the clashing point 500 and its physical effects on the cable 502 serves only as an example and does not limit other cable abrasion or related scenarios in any manner. For example, in some instances, reducing the outer diameter of the deepwater optical fiber cable (or removing material from the cable) may not necessarily reduce the cable weight in the water. The cable weight in the water may be a function of the weight in air of the cable minus the amount of displaced seawater, which may also be known as buoyancy. For instance, as a cable diameter is reduced, buoyancy may be reduced. Alternatively, if the cable diameter is enlarged, the buoyancy may be higher. In at least that regard, it may be understood that the SPA cable may be modified or optimized at least in accordance with these principles, design goals or constraints, and the like.

Figure 6:
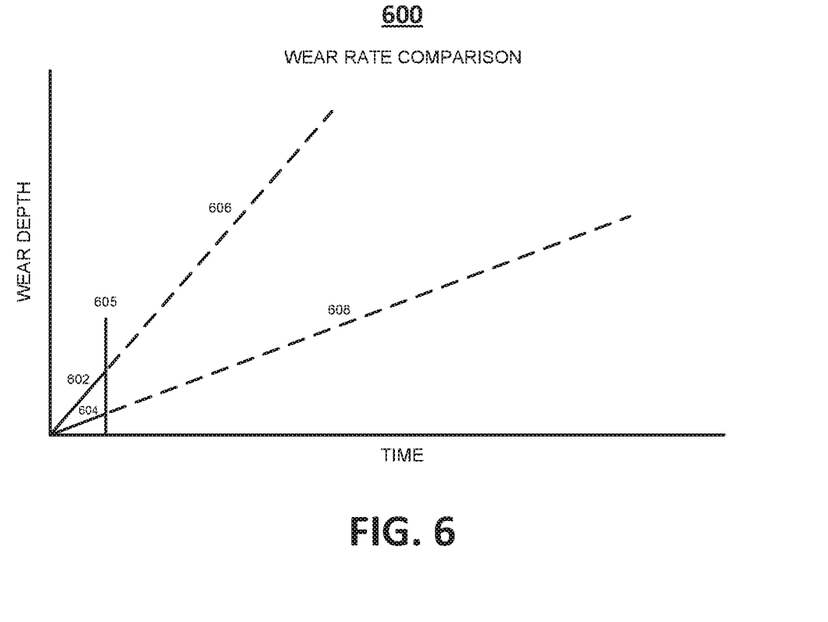
FIG. 6 illustrates an example wear rate comparison plot.

FIG. 6 illustrates an example wear rate comparison plot 600 according to embodiments. The plot 600 shows a wear rate 602 of a traditional deepwater cable and a wear rate 604 of a modified SPA cable (e.g., modification 300, modification 400), both of which may be plotted as wear depth over time. Line 605 may represent a time at which the traditional deepwater cable and the modified SPA cable have been compromised (e.g., clash, tangle, otherwise physically interact) by a deepwater object, such as a FAD.

The plot 600 further shows an extrapolation rate 606 representing an extrapolated time for the traditional deepwater cable to be consumed (which may be broadly understood to refer to the protection layers, such as the cable jackets, being worn or abraded to point of cable damage, malfunction, or failure). Similarly, an extrapolation rate 608 is also shown, which represents an extrapolated time for the modified SPA cable to be consumed. A comparison between plots 602, 606 and plots 604, 608 shows that it takes a much longer period of time for the modified SPA cable to be damaged by wear or abrasion after a compromising event compared to the traditional deepwater cable, as illustrated.

Figure 7:
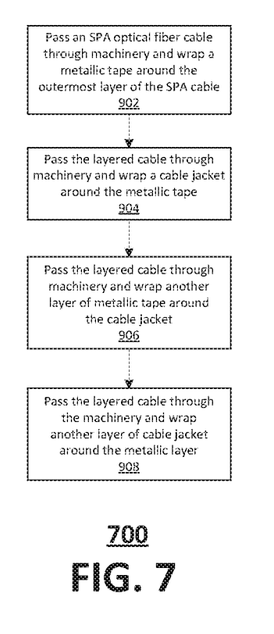
FIG. 7 illustrates an example flow diagram.

FIG. 7 illustrates an example flow diagram 700 according to embodiments. The flow diagram 700 relates to a process for manufacturing a modified SPA optical cable (e.g., modification 300, modification 400). At block 902, an SPA optical fiber cable, such as the one illustrated in FIG. 2, may be passed (or may otherwise be known or referred to as a pass or performing a pass) through machinery to wrap a metallic tape (e.g., adhesive-coated steel tape) around the outermost layer of the SPA optical cable. In examples, the metallic tape may have an outer diameter of 17.6 mm. It may be understood that the machinery may be any suitable machine or equipment configured to at least wrap, sheath, encase cable layers onto each other at predefined lengths.

At block 904, the cable now layered with the metallic tape at block 902 may be passed through the machinery to wrap a jacket around the metallic tape or to extrude jacket material onto the metallic tape. As set forth above, the outer diameter of the jacket may be 21 mm. Moreover, the jacket may be made from various materials, such as HDPE, nylons, filled nylons, thermoplastic urethane, etc. At block 906, the cable now layered with the jacket at block 904, may be again passed through the machinery to wrap another layer of metallic tape around the jacket. The outer diameter of this layer of metallic tape may be 21.5 mm.

At block 908, the cable now layered with the second additional layer (e.g., third total layer) of the metallic tape may be passed through the machinery to wrap another cable jacket (e.g., outermost jacket layer) around the metallic tape or to extrude more jacket material onto the metallic tape. As described above, the outer diameter of the outermost jacket may be optimally adjusted, e.g., to 31.8 mm, to 38.1 mm. It may be understood that more layers of tape and jackets may be added. It may further be understood that, in some processes, the passing of the metallic tape then the passing of the cable jacket may be combined as a single passing step.

As set forth above, the above-described examples and embodiments are advantageous for numerous reasons. For example, deploying armored cables in deep waters can be avoided by modifying existing SPA optical fiber cables with additional layers of metallic tape and cable jackets. Because armored cables have helically wound high-strength steel wires at the outer layer(s), the cables are highly susceptible to kinking, looping, or other undesirable effects at deep ocean depths when the cables interact with (e.g., tangle, laid over) deep water objects (e.g., FADs, FAD mooring lines). The kinking, looping, etc. of the armored cables may cause shunt faults or other system-related failures. The modified SPA optical cable described herein (e.g., modification 300 of FIG. 3, modification 400 of FIG. 4) virtually eliminates all risks associated with kinking or looping. Moreover, the modified SPA cables are also advantageous because they are adequately protected against abrasion or other types of damage in deep water environments. Additionally, the overall design process of the modified SPA cables are highly customizable, tunable, and/or adjustable, where the thickness of the various layers as well as the material thereof can be optimally selected and mixed-and-matched for desired performance. And by using already existing material and machinery for the standard SPA optical fiber cable, the process of manufacturing the modified SPA cables are efficient and streamlined.

Herein, a novel and inventive techniques for improving abrasion (or general damage) protection in deepwater optical fiber cables are disclosed. The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings.

Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. An optical fiber cable comprising:
    a cable core;
    a first tape-jacket layer wrapped around the cable core, wherein the first tape-jacket layer is a first tape wrapped around an insulating sheath of the cable core and a first jacket wrapped around the first tape;
    a second tape-jacket layer wrapped around the first tape-jacket layer, wherein the second tape-jacket layer is a second tape in direct physical contact with the first jacket and a second jacket wrapped around the second tape; and
    a third tape-jacket layer wrapped around the second tape-jacket layer, wherein the third tape-jacket layer is a third tape in direct physical contact with the second jacket and a third jacket wrapped around the third tape,
    wherein the third tape-jacket layer is thicker than the second-tape jacket layer,
    wherein the second tape-jacket layer is thicker than the first tape-jacket layer,
    wherein the first tape, the second tape, and the third tape are a same first material, and wherein the first jacket, the second jacket, and the third jacket are a same second material.

2. The optical fiber cable of claim 1, wherein the cable core comprises:
    one or more optical fibers;
    a tube encasing the one or more optical fibers;
    a plurality of strength members;
    a conductor layer wrapped around the plurality of strength members; and
    the insulating sheath wrapped around the conductor layer.

3. The optical fiber cable of claim 2, wherein the first tape is a first metallic tape, wherein the second tape is a second metallic tape, and wherein the third tape is a third metallic tape.

4. The optical fiber cable of claim 3, wherein the second metallic tape has an outer diameter of 17.6 millimeters (mm) and the second jacket has an outer diameter of 21 mm.

5. The optical fiber cable of claim 3, wherein the third metallic tape has an outer diameter of 21.5 millimeters (mm) and the third jacket has an outer diameter of 31.8 mm or 38.1 mm.

6. The optical fiber cable of claim 1, wherein the third tape-jacket layer has an outer diameter of 31.8 millimeters.

7. The optical fiber cable of claim 1, wherein the third tape-jacket layer has an outer diameter of 38.1 millimeters.

8. The optical fiber cable of claim 3, wherein the first, second, and third metallic tapes are adhesive-coated steel tapes and each of the first, second, and third jackets are made of one of the following: (i) high-density polyethylene (HDPE), (ii) nylon, (iii) filled nylon, and (iv) thermoplastic urethane.

9. The optical fiber cable of claim 1, wherein the cable core and the first tape-jacket layer are included in or forms a special application (SPA) optical fiber cable.

10. The optical fiber cable of claim 1, wherein the third tape-jacket layer is an outermost layer exposed to an exterior of the optical fiber cable, and wherein none of the first, second, and third tape-jacket layers include helically wound metal or armor wires.

11. An optical fiber cable comprising:
    a cable core;
    a first metallic tape wrapped around an outermost layer of cable core;
    a first jacket wrapped concentrically around the first metallic tape, wherein the first metallic tape and the first jacket are in direct physical contact with one another, and wherein the first metallic tape and the first jacket layer are different materials;
    a second metallic tape wrapped around the first jacket, wherein the second metallic tape is in direct physical contact with the first jacket layer; and
    a second jacket wrapped around the second metallic tape;

a third metallic tape wrapped around the second jacket layer, wherein the third metallic tape is in direct physical contact with the second jacket; and a third jacket wrapped around the third metallic tape, wherein the second tape and the second jacket together are thicker than the first tape and the first jacket together, wherein the third tape and the third jacket together are thicker than the second tape and the second jacket together, wherein the first metallic tape, the second metallic tape, and the third metallic tape are a same metallic material, and wherein the first jacket, the second jacket, and the third jacket are a same material.

12. The optical fiber cable of claim 11, wherein the outer diameter of the second jacket is 21 millimeters (mm), 31.8 mm, or 38.1 mm.

13. The optical fiber cable of claim 11, wherein the first, second, and third metallic tapes are adhesive-coated steel tapes and each of the first, second, and third jackets are made of one of the following: (i) high-density polyethylene (HDPE), (ii) nylon, (iii) filled nylon, and (iv) thermoplastic urethane.

14. A method for manufacturing an optical fiber cable, the method comprising:

passing a special application (SPA) optical fiber cable through machinery and wrapping a first metallic tape around an outermost layer of the SPA cable to form a first layered cable;

passing the first layered cable through the machinery and forming a first jacket directly onto the first metallic tape, wherein the first jacket is formed concentrically about the first metallic tape, and wherein the first jacket and the first metallic tape are different materials;

passing the first jacket and the first metallic tape through the machinery;

forming a second metallic tape directly atop the first jacket and forming a second jacket directly atop the second metallic tap;

passing the second metallic tape and the second cable jacket through the machinery; and forming a third metallic tape directly atop the second jacket and forming a third jacket directly atop the third metallic tape, wherein the second metallic tape and the second jacket together are thicker than the first metallic tape and the first jacket together, wherein the third metallic tape and the third jacket together are thicker than the second metallic tape and the second jacket together, wherein the first metallic tape, the second metallic tape, and the third metallic tape are a same metallic material, and wherein the first jacket, the second jacket, and the third jacket are a same material.

15. The method of claim 14, wherein the first, second, and third metallic tapes are adhesive-coated steel tapes and each of the first, second, and third jackets are made of one of the following: (i) high-density polyethylene (HDPE), (ii) nylon, (iii) filled nylon, and (iv) thermoplastic urethane.

16. The method of claim 14, wherein an outer diameter of the wrapped first jacket is 21 millimeters.

17. The method of claim 14, wherein an outer diameter of the second cable jacket is 31.8 millimeters.

18. The method of claim 14, wherein an outer diameter of the second cable jacket is 38.1 millimeters.

19. The optical fiber cable of claim 1, wherein the first tape-jacket layer, the second tape-jacket layer, and the third tape-jacket layer are unarmored.

\* \* \* \* \*